United States Patent [19]

Noga

[11] Patent Number: 5,735,014
[45] Date of Patent: Apr. 7, 1998

[54] GRILL CLEANING DEVICE

[76] Inventor: Robert A. Noga, 6404 Nancy Ridge Dr., San Diego, Calif. 92121

[21] Appl. No.: 716,482

[22] Filed: Sep. 18, 1996

[51] Int. Cl.⁶ ........................................ A47L 13/08
[52] U.S. Cl. ..................... 15/236.06; 15/236.08; 30/172
[58] Field of Search .................. 15/236.05, 236.06, 15/236.07, 236.08, 236.09, 236.01, 111, 143.1; D32/42–52; 30/169, 172, 173

[56] References Cited

U.S. PATENT DOCUMENTS

| | | | |
|---|---|---|---|
| 434,982 | 8/1890 | Erwin | 30/169 |
| 514,840 | 2/1894 | Streeter | 15/236.01 |
| 717,456 | 12/1902 | Schiele | 15/236.01 |
| 896,394 | 8/1908 | Kindred | 15/236.01 |
| 1,156,683 | 10/1915 | Havlicek et al. | 15/236.06 |
| 1,264,350 | 4/1918 | Unsinger | 30/169 |
| 1,704,329 | 3/1929 | Klaus | 15/236.07 |
| 3,137,879 | 6/1964 | Dootson | 15/245.1 |

FOREIGN PATENT DOCUMENTS 565833  12/1932  Germany ................. 15/236.06

Primary Examiner—Gary K. Graham
Attorney, Agent, or Firm—William Patrick Waters

[57] ABSTRACT

A grill cleaning device for removing unwanted residue from grill rail surfaces. The device includes an elongated handle. A rigid blade, for removing residue from the top surfaces of the rails, is mounted at one end of the handle. A deformable coiled wire, for removing residue from the side surfaces of the rails, is wrapped around the blade.

5 Claims, 1 Drawing Sheet

U.S. Patent    Apr. 7, 1998    5,735,014
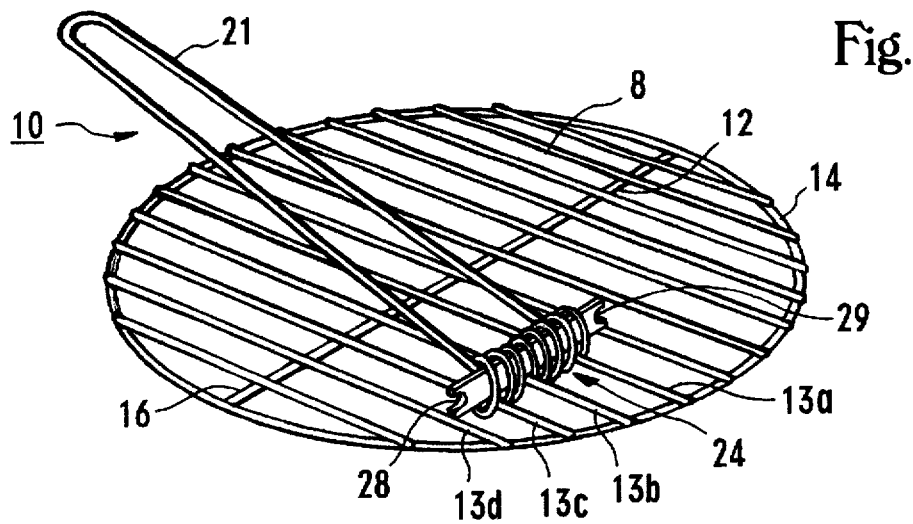
Fig. 1
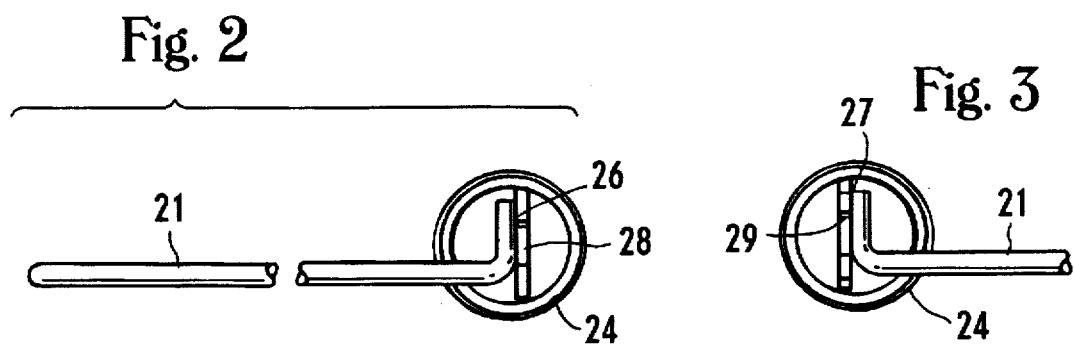
Fig. 2    Fig. 3
Fig. 4
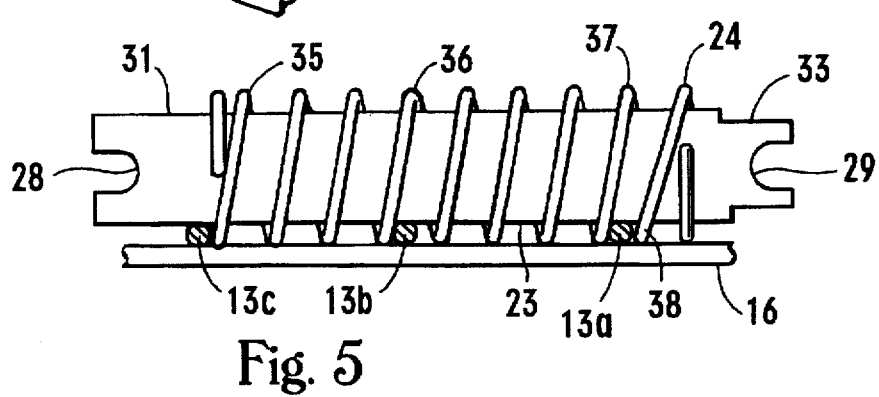
Fig. 5

GRILL CLEANING DEVICE

FIELD OF THE INVENTION

The present invention relates generally to cleaning implements and, more particularly, to devices for cleaning cooking surfaces, including grills.

BACKGROUND ART

The outdoor barbecue has become very popular in modern society and it is used daily, throughout the country, for preparation of a variety of meals. In general, the typical barbecue utilizes gas or burning charcoal to heat a grill to cooking temperatures.

Frequently, after food has been cooked, a charred, sometimes greasy residue remains on the grill surface. Often, the residue is left on the grill only to be removed at the next time the barbecue is to be used. Removal of such residue is desirable, not only for aesthetic reasons, but also because some evidence suggests that, at least in some cases, its ingestion may be injurious to health. Thus, it has been recognized that it is desirable to have a technique for cleaning barbecue grills efficiently and effectively.

In some cases, a barbecue grill may be cleaned relatively easily shortly after the food has been cooked and while the grill is still hot. Generally, however, cleaning does not take place at this time since the emphasis is on enjoyment of the barbecued food, not on housekeeping. Thus, the task of grill cleaning is postponed and the grill residue hardens and adheres tenaciously to the grill surface. This, of course, makes the cleaning job more difficult prior to the next use.

The problem of cleaning is compounded by the shape and design of conventional grills. In a typical case, the barbecue grill is comprised of a framework having a plurality of parallel bars, or rails, for supporting the food during cooking. Often, one or more supporting members are attached to the rails, generally perpendicular to the long axis of the rails, to lend stability and strength to the framework. In conventional grills, the rails often have a curved top surface which can facilitate the removal of food from the grill. However, the curved surface can increase the difficulty of removing residue by making the residue more inaccessible than would otherwise be the case.

Conventional grill cleaning implements, ranging from spatula type blades to wire brushes, are currently in use. The blade type devices are effective for scraping flat grill surfaces but are sometimes limited in cleaning curved surfaces. In addition, the conventional spatula is not capable of removing unwanted residue from the sides of the grill rails. Grill cleaning brushes, often having copper bristles, are more flexible in cleaning curved surfaces and the rail sides. However, the brush tends to broadcast the residue from the grill, thereby fouling the immediate environment and, in some cases, soiling the clothing of the user. Further, even after just one use, the brush becomes greasy and unattractive in appearance.

In view of the foregoing, it would be desirable to have a grill cleaning device which is efficient in cleaning grill surfaces, including the curved rail top surfaces and rail sides. Ideally, such a device would be capable, also, of cleaning the sides of the rail top surfaces and sides simultaneously, in a convenient manner. In addition, it would be highly desirable to have a grill cleaning device which, itself, would be easily cleaned and would be constructed of readily available, low cost materials.

DISCLOSURE OF INVENTION

It is an object of the present invention to provide a grill cleaning device which is effective and efficient in cleaning grill surfaces, including curved surfaces.

It is another object of the present invention to provide a grill cleaning device which is capable of cleaning grill rail top surfaces and sides simultaneously.

It is a further object of the present invention to provide a grill cleaning device which itself is readily cleaned.

It is a still further object of the present invention to provide a grill cleaning device which is made of inexpensive, readily available materials.

Briefly, the above and further object of the present invention are realized by providing a grill cleaning device for removing unwanted residue from grill rail surfaces. The device includes an elongated handle. A rigid blade, for removing residue from the top surfaces of the rails, is mounted at one end of the handle. A deformable coiled wire, for removing residue from the side surfaces of the rails, is wrapped around the blade.

The present invention presents several distinct advantages. Firstly, because of the deformable spring, wrapped around the blade, the device combines the attractive features of the spatula type scrapper with the versatility of the wire brush. Thus, an efficient method of cleaning residue from the tops, curved portions and sides of grill rails is available. In addition, the device is easily cleaned after use and it is constructed of readily available materials.

BRIEF DESCRIPTION OF DRAWINGS

The above mentioned and other objects and features of this invention and the manner of attaining them will become apparent and the invention itself will be best understood by reference to the following description of the embodiment of the invention in conjunction with the accompanying drawings, wherein:

FIG. 1 is a pictorial view showing the present invention and a conventional barbecue grill;

FIG. 2 is a left side view of a portion of the present invention;

FIG. 3 is a right side view of a portion of the present invention;

FIG. 4 shows a portion of the present invention and a portion of a conventional barbecue grill; and FIG. 5 shows another portion of the present invention and another portion of a conventional barbecue grill.

BEST MODE FOR CARRYING OUT THE INVENTION

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

Referring now to the drawings, and in particular to FIG. 1 thereof, there is shown a novel grill cleaning device 10 which is constructed according to the present invention. The device 10 is shown atop a conventional barbecue grill 12. The grill 12 is comprised of a plurality of rails, such as the rails 13a, 13b, 13c and 13d, which are supported by a ring 14 and a supporting rail 16. While the rails 13a–13d are depicted as round in cross section, it will be recognized that the present invention is effective in cleaning grill rails having other configurations.

The cleaning device 10 includes a bent, elongated wire handle 21 which terminates at one end in a leg 26 and, at the other end, in a leg 27. The legs 26 and 27 are brazed to a blade 23. A deformable wire coil 24 is wrapped around the blade 23 and the wire coil 24 is disposed between the places of attachment of the legs 26 and 27, respectively, to the blade 23.

The blade 23 includes an arcuate groove 28 at one end and a second arcuate groove 29 at the opposite end. The radius of curvature of the groove 29 is larger than that of the groove 28. As shown in FIG. 5, the blade 23 can be used to scrape the ring 14 by engaging the ring within the groove 29. If it is desirable to scrape a barbecue rail having a smaller cross sectional diameter than that of the ring 14, the opposite end of the blade 23, having the groove 28, can be used. In addition to the use of the grooved portions of the blade 23 for scraping rail surfaces, the blade 23 includes an end portion 31 which can be utilized to scrape debris from the sides of parallel grill rails. At the end of the blade 23, opposite the portion 31, the blade 23 includes a narrowed end portion 33 which is utilized in a manner similar to that for the opposite end. In this regard, the end portion 33 is usable when the space between rails is too narrow to accommodate the portion 31.

In addition to the uses of the device 10 as set forth above, the additional novel features of the device 10 are clearly understood by reference to FIG. 5 in which structural elements previously described in relation to FIG. 1 are designated by identical reference characters. In FIG. 5, a portion of the grill cleaning device 10 and a portion of the grill 12 are shown.

In using the device 10, the user urges the blade 23 against the grill rails, as for example, the rails 13a, 13b and 13c, and cleans the grill with a back and forth motion. It will be noted that, as the blade 23 cleans the top portions of the rails, the deformable wire coil scrapes the sides of the rails. This is seen in FIG. 5 where coil elements 35 and 36 are shown abuttting the sides, respectively, of the rails 13c and 13b and where coil elements 37 and 38 are shown on opposite sides of the rail 13a.

In addition to its function in cleaning the rails 13a, 13b and 13c, it will be noted also that the deformable wire coil 24 can simultaneously clean the top surface of the support rail 16.

In view of the foregoing, the present invention comprises a novel combination of the deformable wire coil 24 which can be deformed to clean hard to reach places on the grill 12, together with the blade 23. In this manner, a grill cleaning device having significant utility is provided.

It will be evident that there are additional embodiments and applications which are not disclosed in the detailed description but which clearly fall within the scope and spirit of the present invention. The specification is, therefore, intended not to be limiting, and the scope of the invention is to be limited only by the following claims.

What is claimed is:

1. A grill cleaning device for scraping unwanted residue from the top surfaces and the side surfaces of grill rails, said device comprising:

a handle, said handle including a pair of elongated coplanar legs, each one of said legs having a free end;

an elongated blade for scraping the top surfaces of said rails, said blade having a pair of spaced apart points of attachment wherein a first one of the free ends of said legs is fixed to said blade at a first one of said pair of points of attachment and a second one of the free ends of said legs is fixed to said blade at a second one of said points of attachment; and coil means for scraping the side surfaces of said rails, said coil means being wrapped around said blade and being disposed between said points of attachment.

2. A grill cleaning device according to claim 1 wherein said blade includes groove means for scraping a rail surface.

3. A grill cleaning device according to claim 1 wherein said blade includes a plurality of grooves for scraping rail surfaces.

4. A device according to claim 1 wherein said blade is attached to the free ends of said elongated legs in a substantially perpendicular relationship to the plane of said legs.

5. A device according to claim 1 wherein said blade includes first means for scraping rail side surfaces, said rails being separated by a first distance, and second means for scraping rail side surfaces, said rails being separated by a second distance.

* * * * *